(12) United States Patent
Andrews et al.

(10) Patent No.: US 6,931,133 B2
(45) Date of Patent: Aug. 16, 2005

(54) METHOD AND SYSTEM OF SECURELY ESCROWING PRIVATE KEYS IN A PUBLIC KEY INFRASTRUCTURE

(75) Inventors: Richard F. Andrews, Menlo Park, CA (US); Zhiyong Huang, Sunnyvale, CA (US); Tom Qi Xiong Ruan, San Jose, CA (US)

(73) Assignee: Verisign, Inc., Mountain View, CA (US)

( * ) Notice: Subject to any disclaimer, the term of this patent is extended or adjusted under 35 U.S.C. 154(b) by 38 days.

(21) Appl. No.: 10/232,624

(22) Filed: Sep. 3, 2002

(65) Prior Publication Data

US 2004/0042620 A1 Mar. 4, 2004

(51) Int. Cl.[7] .................................................. H04L 9/00
(52) U.S. Cl. ...................................... 380/286; 380/278
(58) Field of Search ........................................ 380/286

(56) References Cited

U.S. PATENT DOCUMENTS

| | | | | |
|---|---|---|---|---|
| 4,941,176 A | * | 7/1990 | Matyas et al. ............... | 380/280 |
| 5,825,880 A | * | 10/1998 | Sudia et al. ................. | 713/180 |
| 6,009,177 A | * | 12/1999 | Sudia ........................... | 713/191 |
| 6,064,738 A | * | 5/2000 | Fridrich ........................ | 380/28 |
| 6,335,972 B1 | * | 1/2002 | Chandersekaran et al. .. | 380/286 |
| 6,370,251 B1 | * | 4/2002 | Hardy et al. ................. | 380/286 |
| 6,662,299 B1 | * | 12/2003 | Price, III ..................... | 713/171 |

OTHER PUBLICATIONS

Bruce Schneier, Applied Cryptography, 1996, John Wiley & Sons, Inc, pp. 294–295.*

* cited by examiner

*Primary Examiner*—Gilberto Barrón, Jr.
*Assistant Examiner*—Benjamin E. Lanier
(74) *Attorney, Agent, or Firm*—Kenyon & Kenyon

(57) ABSTRACT

A method of restricting access to private keys in a public key infrastructure provides for storage of an encrypted private key at a primary site. A masked session key is stored at a secondary site, where the masked session key enables recovery of the private key. By using distributed storage architecture for recovery data, simplification can be achieved without sacrificing security.

26 Claims, 9 Drawing Sheets

US 6,931,133 B2

METHOD AND SYSTEM OF SECURELY ESCROWING PRIVATE KEYS IN A PUBLIC KEY INFRASTRUCTURE

TECHNICAL FIELD

Embodiments of the present invention generally relate to public key encryption. More particularly, embodiments relate to the escrowing of private keys using a distributed storage architecture for recovery data.

BACKGROUND OF THE INVENTION

As the popularity of the Internet and E-commerce continues to grow, the issue of security is a primary concern. In order for online transactions to continue to be a viable alternative to traditional transactions, mechanisms to secure connections between parties is critical. In a public key infrastructure, each party needs a key pair made up of one key that is made public (the public key) and another key that is kept private (the private key). The public key is placed in a digital certificate and signed using an algorithm such as the well-documented digital signature algorithm (DSA) to verify that the owner of the public key is indeed who they claim to be. While some applications allow the owner to create the key pair and generate the digital certificate themselves, in applications wherein security is of particular concern, a third party called a certificate authority (CA) is often used to verify the identity of the owner of a public key pair.

In many cases, the CA will use a registration authority (RA) to determine whether the digital certificate should be issued to the owner of the key pair. The RA will often keep a backup copy of the owner's private key, which is generally referred to as key escrow. Clearly, the escrowed copy of the private key must be securely stored and protected to avoid unintentional disclosure. There is therefore a need to securely escrow a private key such that it is very difficult for an unauthorized party to gain access to it.

While a number of approaches to key escrow have been developed, certain difficulties remain. FIGS. 1 and 12–14 demonstrate a conventional approach to key escrow, and highlight these difficulties. Specifically, FIG. 1 shows a public key infrastructure wherein an end user 130 is provided a key pair 132 by a primary site 140 over a secure connection via network 160. It can be seen that a key management server (KMS) 180 stores a key recovery record (KRR, or encrypted private key) 20, which is an encrypted version of the private key in key pair 132, and recovery data 22 in a primary database 24 located at the primary site 140. A session key is used to secure the encrypted private key 20.

FIG. 14 illustrates a conventional approach to structuring the recovery data 22 (FIG. 1). Generally, it can be seen that the session key and a password are encrypted with the public keys of three entities: Key Recovery Coordinator (KRC), Key Recovery Officer (KRO), and Key Recovery Agent (KRA). A password is provided by an administrator at the primary site 140 (FIG. 1), and the session key is generated by the key management server 180 (FIG. 1). The recovery data 22 is sometimes referred to as the Key Recovery Block (KRB). Returning now to FIG. 1, it will be appreciated that to recover a private key, authorized key recovery personnel such as the administrator discussed above, sends the recovery data 22 to a key recovery server located at a secondary site 26 along with a candidate password provided by the administrator. The candidate password must match the password contained in the recovery data 22 before the secondary site 26 will provide the recovery requesting administrator with the session key.

Thus, FIG. 12 illustrates that a private key is encrypted with a session key at processing block 28, and the recovery data 22 and encrypted private key 20 are stored at the primary site 26 (FIG. 1) in processing block 30. FIG. 13 illustrates that in order to recover the private key, the recovery data 22 and the encrypted private key 20 are retrieved from the primary site memory at block 32, and the recovery data 22 and candidate password are sent to the secondary site 26 at block 34. The key recovery server (KRS) 36 decrypts the recovery data 22 using the KRC, KRO and KRA public keys and determines whether the candidate password 38 supplied by the administrator matches the password contained within the decrypted recovery data 22. If so, the session key 40 is sent from secondary site 26 to primary site 140. Once received at block 36, the encrypted private key is decrypted at block 42 based on the session key 40. The result is private key 44, which can be re-sent to the end user 130 (FIG. 1).

While the above-described approach has been satisfactory in certain circumstances, significant room for improvement remains. For example, by storing both the encrypted private key 20 and the recovery data 22 at the primary site 140, a password mechanism is required in order to recover the private key. Changes in personnel and the continuing concern for security, however, mean that password changes are often necessary. For example, if a particular administrator supplies the password that is contained in the recovery data for a private key, and subsequently discontinues employment with the primary site 140, the administrator's password must be changed. When this occurs, the entire KRB 22 must be regenerated with the new password. Selectively regenerating KRBs based upon personnel changes is administratively complex and inconvenient. There is therefore a need to restrict access to private keys in a public key infrastructure in which passwords are not required.

Another difficulty relates to the use of encryption to secure the recovery data 22. Specifically, the KRC, KRO and KRA key pairs require digital certificates, which often are obtained by the secondary site 26 from one or more external sources. For example, in one commercially available system, the digital certificates must be obtained from the provider of the KRO/KRC/KRA encryption/decryption code. When the secondary site 26 receives the certificates, they are embedded in a configuration file, which is shipped to the KMS 180 (FIG. 1) and installed along with a tool kit capable of performing the encryption. When the certificates expire, however, the tool kit is no longer able to perform the encryption to generate the recovery data 22. Obtaining new, current certificates in a timely fashion can be complex and inconvenient. As a result, undesirable measures such as clock resetting are sometimes resorted to until the new configuration file can be obtained. The consequences are particularly acute when the secondary site 26 must obtain the certificates from an external source as discussed above. There is therefore a need to provide an approach to generating recovery data that does not require the password-protected encryption of a session key with certificates while maintaining an adequate level of security.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
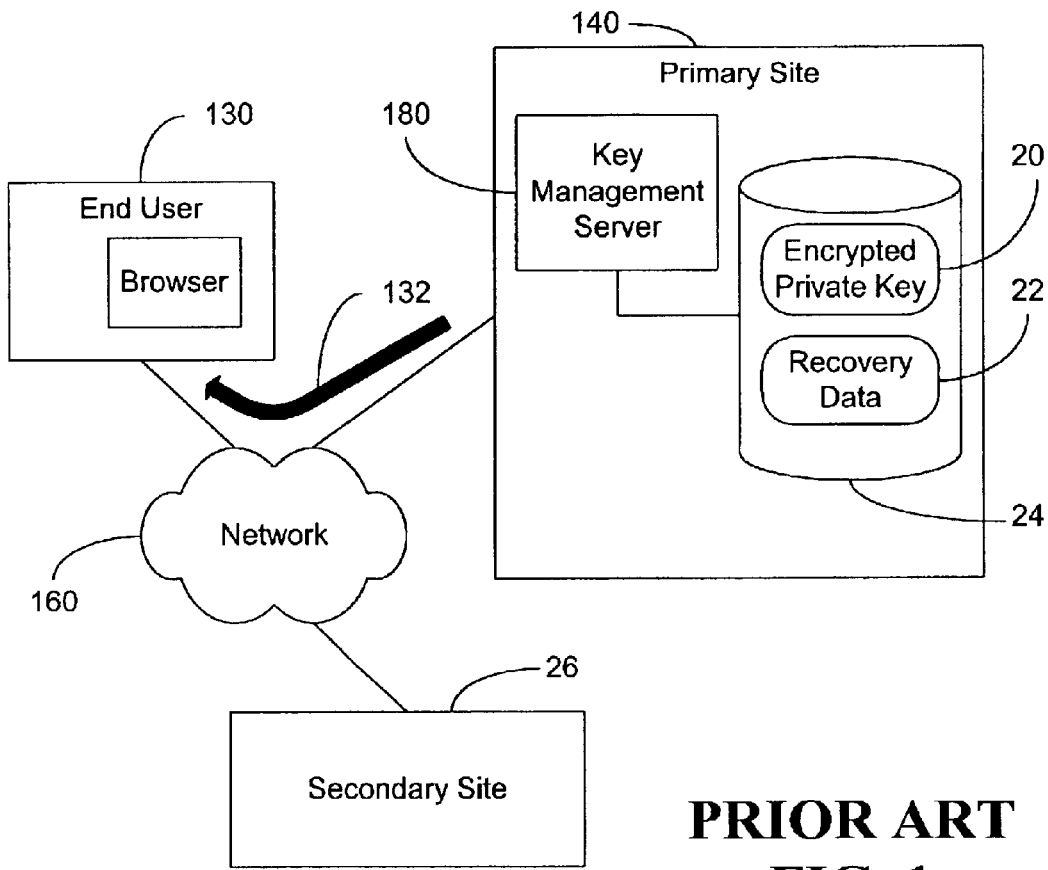
FIGS. 1 and 12–14 are diagrams a conventional approach to restricting access to private keys in a public key infrastructure, useful in understanding the embodiments of the invention.
Figure 12:
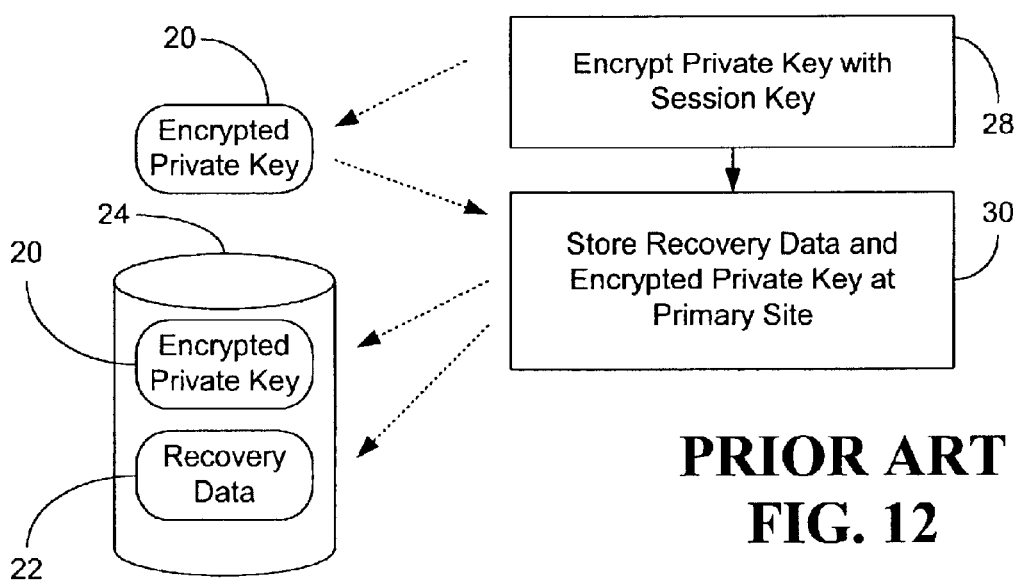
Figure 2:
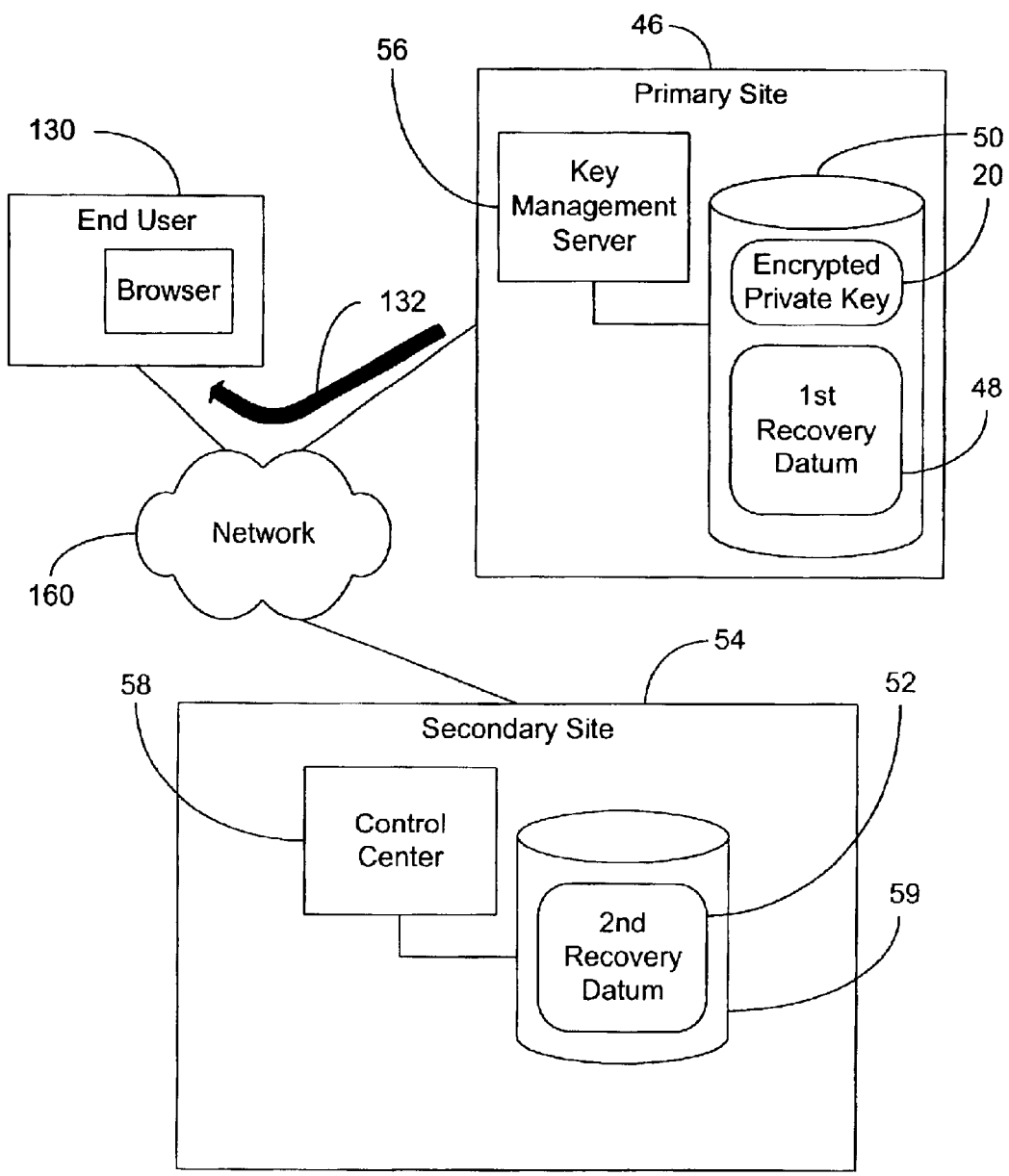
FIG. 2 is a block diagram of an example of a public key infrastructure in accordance with one embodiment of the invention.

Turning now to FIG. 2, a public key infrastructure is shown wherein private key escrow is implemented in accordance with one embodiment of the invention. Generally, the infrastructure uses a distributed storage architecture for recovery data, and eliminates the need for passwords. While the embodiments described herein will be primarily described with regard to wide-area networks (WAN) and the Internet, it will be appreciated that the embodiments are not so limited. In fact, the principles described herein can be useful in any networking environment for which security is an issue of concern. Notwithstanding, there are a number of aspects of Internet applications for which the embodiments are uniquely suited.

Generally, at the time of escrow a protected private key 20 is stored to a memory located at a primary site 46, along with a first recovery datum 48. The private key may be protected by encrypting the private key with a session key, or by performing an exclusive-OR (XOR) operation between the private key and a session mask. In any case, the private key is protected using a session value (i.e., key or mask). While the memory is illustrated as a primary database 50, it should be noted that other storage configurations are possible. For example, the protected private key 20 may be stored in a database which is separate from the first recovery datum 48, or the information could be stored as one or more basic electronic files that are not in a database format. It should also be noted that the memory can be dynamic random access memory (DRAM), Rambus® RAM (RDRAM), static RAM (SRAM), flash memory, hard disk, optical disk, magneto-optical disk, CD-ROM, digital versatile disk, DVD, non-volatile memory, or any combination thereof.

A second recovery datum 52 is sent to a secondary site 54, where the first recovery datum 48 and the second recovery datum 52 can be used together to enable recovery of the private key. As will be discussed in further detail below, the first recovery datum 48 can be a mask and the secondary recovery datum 52 can be a masked session value, where the session value is protected by performing an XOR operation between the session value and the mask. The first recovery datum can also be a masking key, where the session value is protected by encrypting the session value with the masking key. Additionally, communications between the primary site 46 and the secondary site 54 over network 160 are facilitated by a key management server (KMS) 56 and a control center 58 via secure connections according to well known techniques. The control center 58 stores the second recovery datum 52 to a secondary database 59 which can be implemented in any acceptable machine-readable medium as discussed above.

Figure 3:
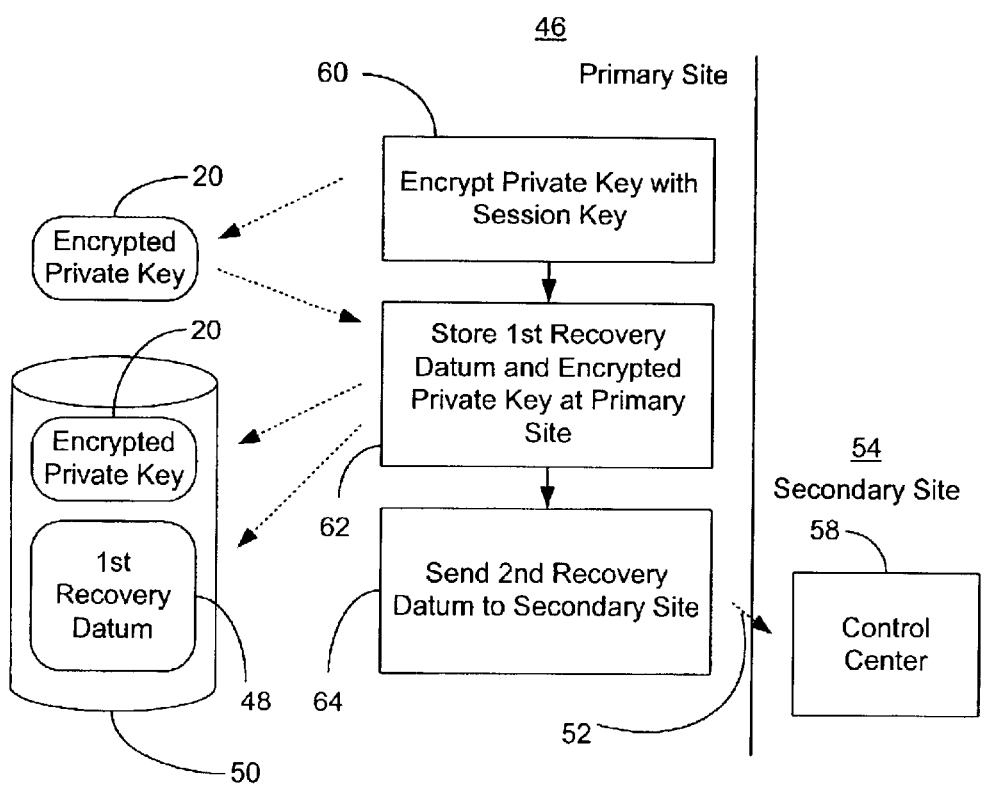
FIG. 3 is a flowchart an example of a method of escrowing a private key in accordance with one embodiment of the invention.

FIG. 3 shows one approach to the key escrow process in greater detail from the point of view of the primary site 46. Specifically, a private key of a key pair is encrypted with a session key at processing block 60. A first recovery datum 48 and the encrypted private key 20 are stored at the primary site 46 at block 62. Processing block 64 provides for sending a second recovery datum 52 to the secondary site 54, where the first recovery datum 48 and the second recovery datum 52 enable recovery of the private key.

Figure 4:
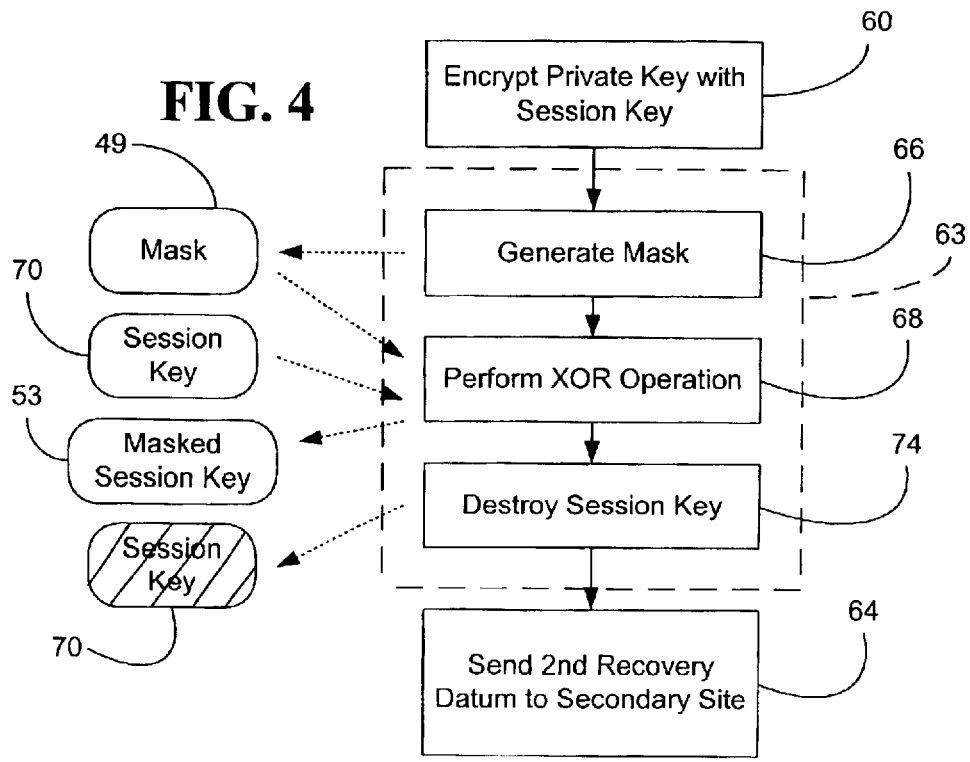
FIG. 4 is a flowchart of an example of a process of storing a first recovery datum and an encrypted private key at a primary site in accordance with one embodiment of the invention.

Turning now to FIG. 4, one approach to storing the first recovery datum 48 (FIG. 3) and the encrypted private key 20 at the primary site 46 (FIG. 3) is shown in greater detail at block 63. Specifically, a mask 49 is generated at block 66 where the first recovery datum includes the mask 49. An exclusive-OR (XOR) operation is performed at block 68 between the mask 49 and the session key 70. The XOR operation results in a masked session key (MSK) 53 where the second recovery datum includes MSK 53. Thus, the mask 49 is stored at the primary site 46 (FIG. 3) and the MSK 53 is sent to the secondary site 54 (FIG. 53) for storage. At this point, the session key 70 is no longer needed and it is destroyed at block 74. In one approach, the memory location holding the session key 70 is zeroed out.

The mask and the session key typically have an identical bit length such as 128 bits. It will further be appreciated that the mask 49 can be generated by either a random or pseudo-random string generation algorithm. The illustrated mask 49 should meet the well-documented Federal Information Processing Standards (FIPS) 140-1 and 140-2.

Figure 5:
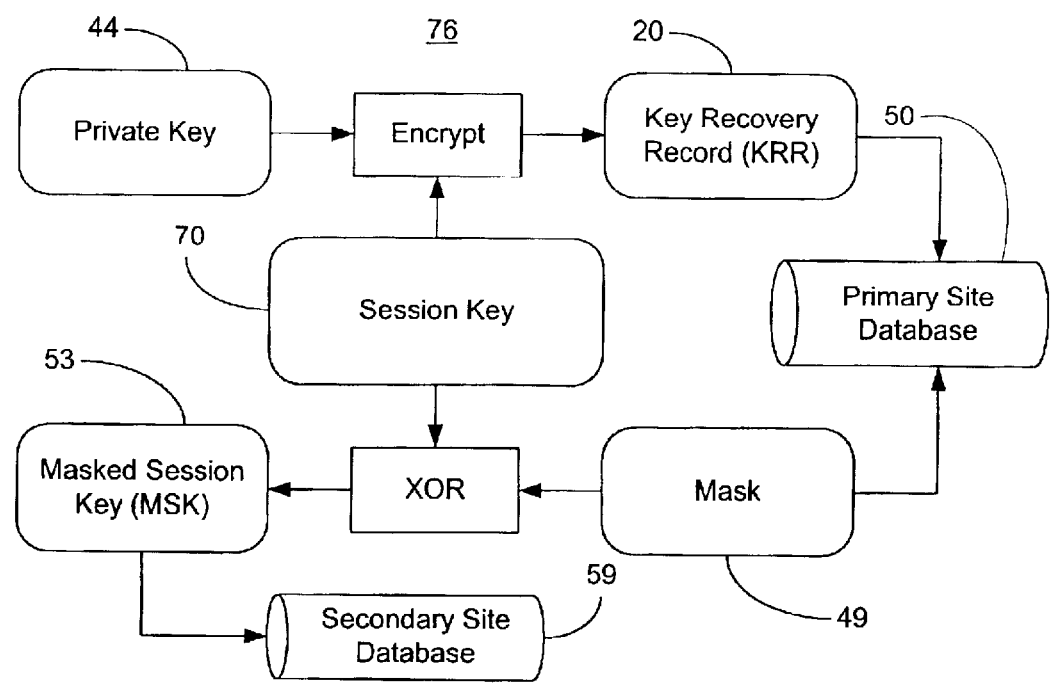
FIG. 5 is a block diagram of an example of a key escrow data flow in accordance with one embodiment of the invention.

Thus, the processing blocks shown in FIGS. 3 and 4 can be implemented as a set of key escrow instructions stored in a machine-readable storage medium accessible by a processor in the KMS 56 (FIG. 2). It should also be noted the KMS 56 can be further adapted to generate the key pair and generate the session key in accordance with well-documented key generation approaches. For example, triple-data encryption standard (3DES) and an initialization vector (IV) can be used to create the symmetric session key. FIG. 5 demonstrates a key escrow data flow 76 summarizing the escrow process.

Figure 6:
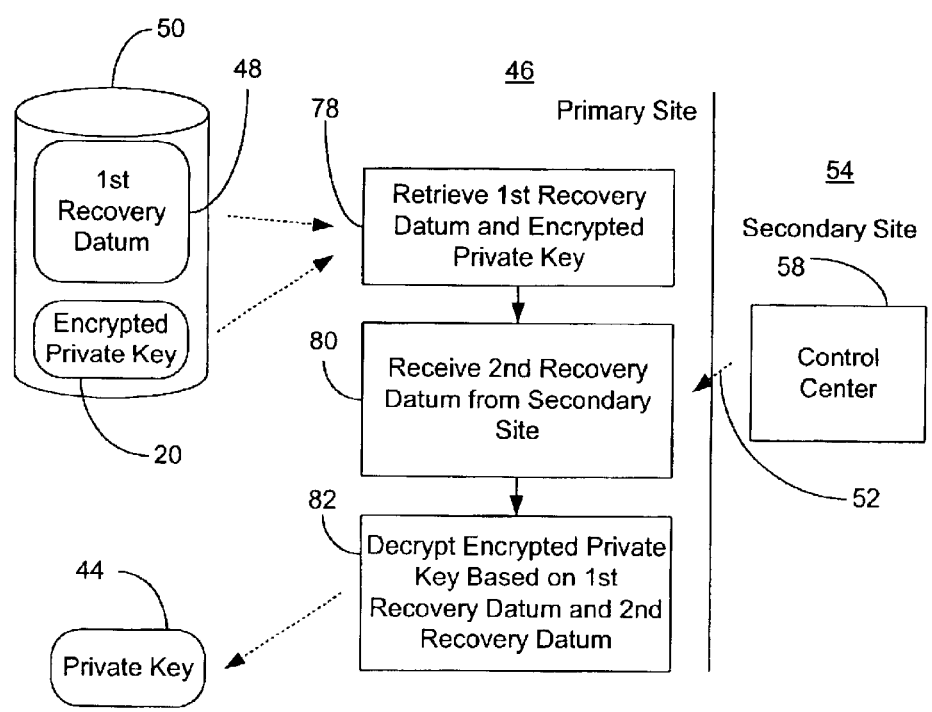
FIG. 6 is a flowchart of an example of a method of recovering a private key in accordance with one embodiment of the invention.

Turning now to FIG. 6, one approach to recovering escrowed private keys is shown. Generally, a first recovery datum 48 and an encrypted private key 20 are retrieved from a memory located at the primary site 46 at block 78. Processing block 80 provides for receiving a second recovery datum 52 from the secondary site 54. The encrypted private key 20 is decrypted at block 82 based on the first recovery datum 48 and the secondary recovery datum 52. As already discussed, in one approach the first recovery datum is a mask and the secondary recovery datum is a masked session key.

Figure 7:
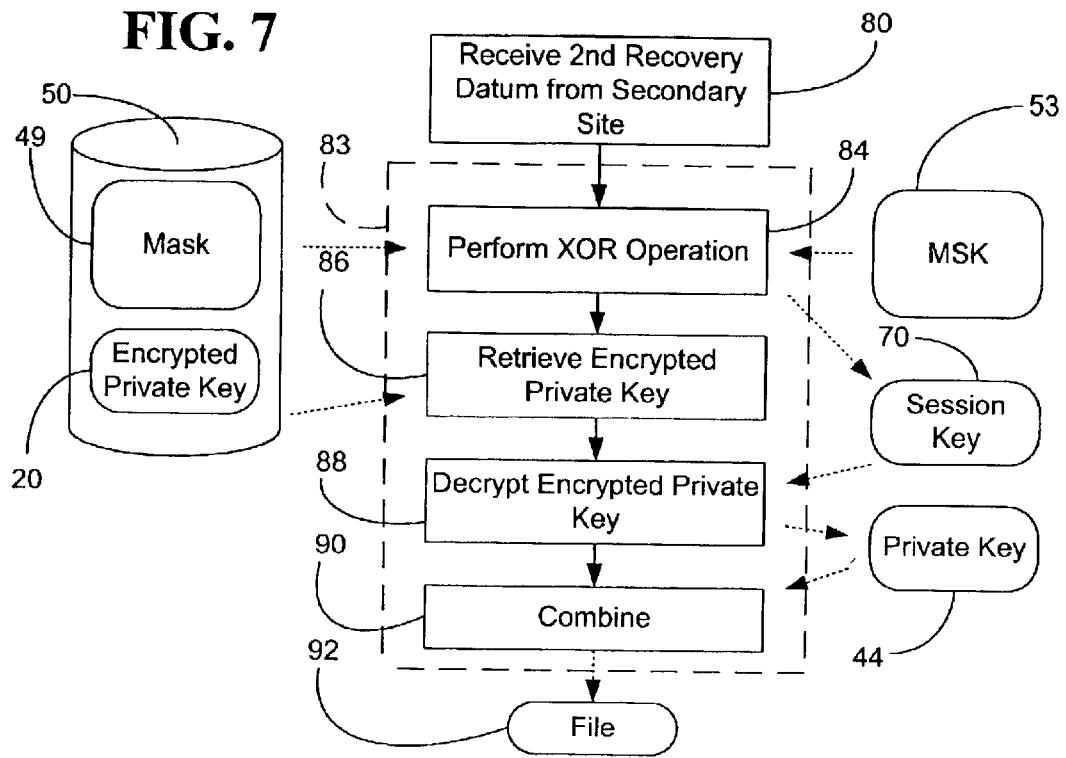
FIG. 7 is a flowchart of an example of a process of decrypting an encrypted private key in accordance with one embodiment of the invention.
Figure 8:
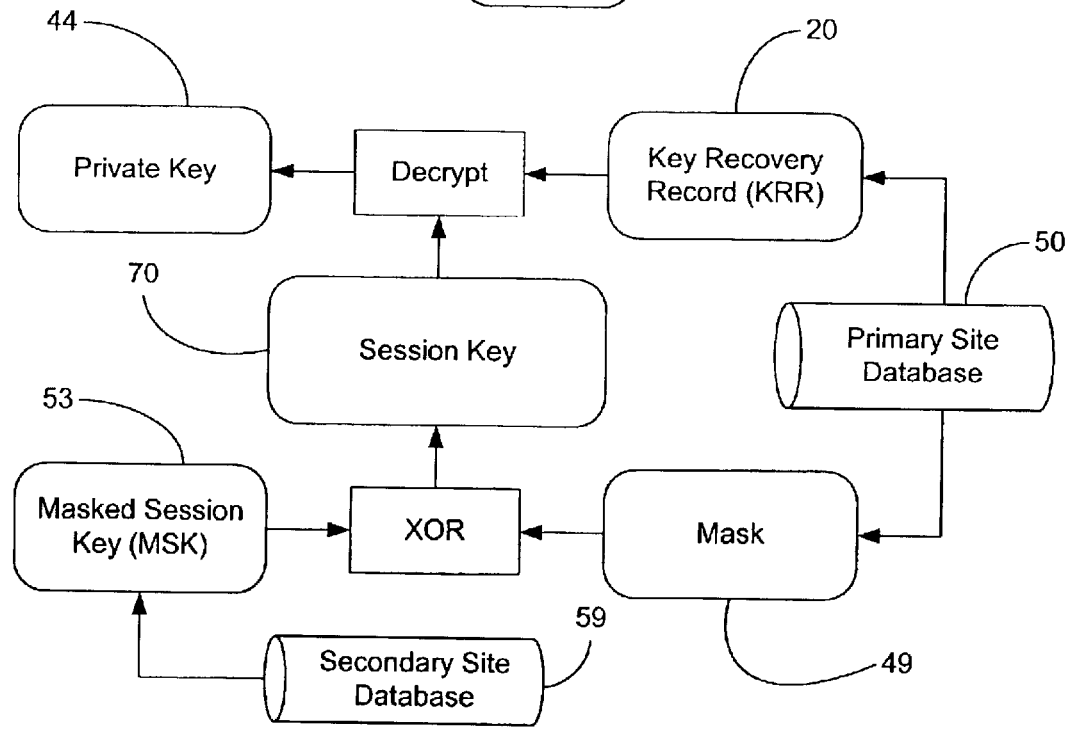
FIG. 8 is a block diagram of an example of a key recovery data flow in accordance with one embodiment of the invention.

FIG. 7 therefore illustrates one approach to decrypting the encrypted private key 20 in greater detail at block 83. Specifically, it can be seen that an XOR operation is performed at block 84 between the mask 49 and the MSK 53, where the XOR operation results in the original session key 70 from which the MSK 53 was derived using the mask 49. An encrypted private key 20 is retrieved at block 86 from a memory located at the primary site, and the encrypted private key 20 is decrypted based on the session key 70 at block 88. Processing block 90 provides for combining the decrypted private key 44 with a corresponding key pair certificate into a file 92 for delivery to the administrator or end user. Thus, the above recovery procedures can be implemented as a set of key recovery instructions and stored to an acceptable machine-readable storage medium that is accessible by a processor in the KMS 56 (FIG. 2). FIG. 8 shows a key recovery data flow 94 to summarize the key recovery process.

Figure 9:
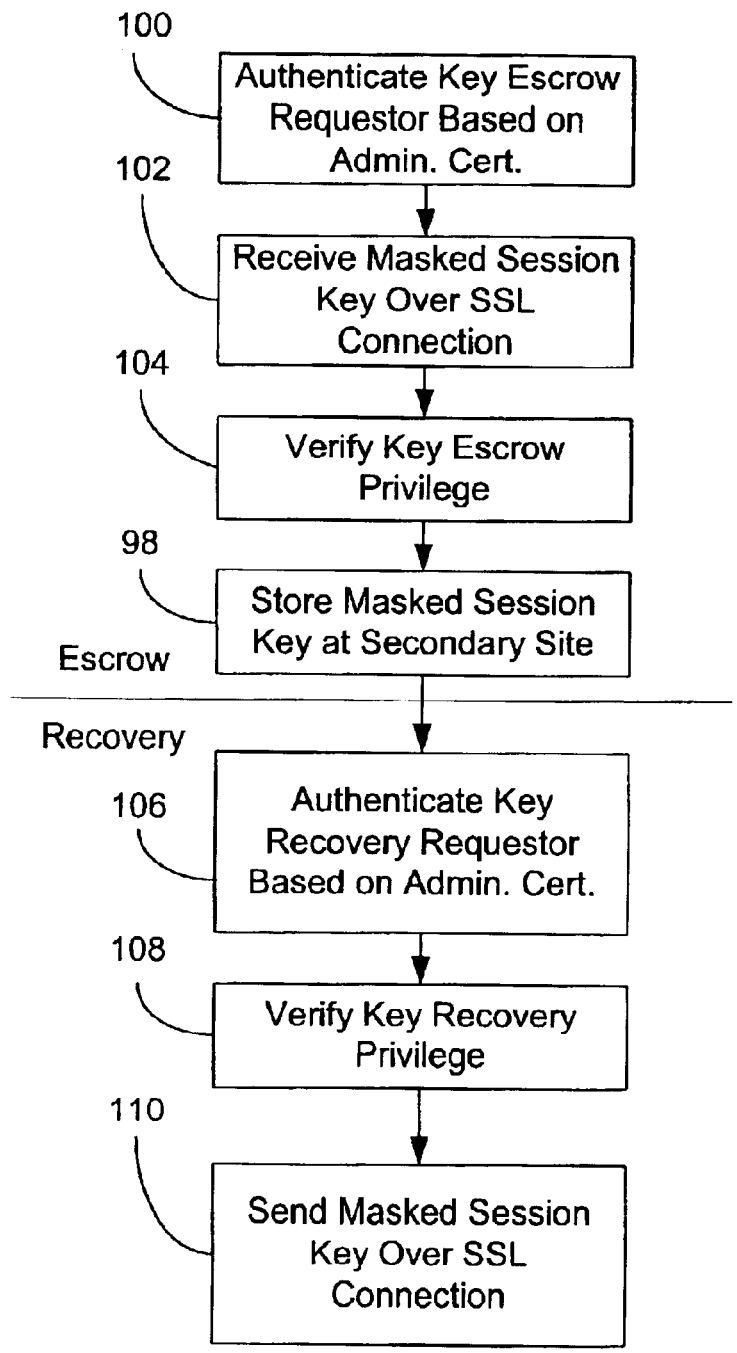
FIG. 9 is a flowchart of an example of a method of restricting access to private keys in a public key infrastructure in accordance with one embodiment of the invention.

Turning now to FIG. 9, a method 96 of restricting access to private keys in a public key infrastructure is shown, wherein an encrypted private key is stored at a primary site. The method 96 can be implemented by a secondary site to maintain the integrity of the private key while it is escrowed at the primary site. The masked session key (MSK) can be stored at the secondary site at processing block 98. The MSK enables recovery of the private key. It should be noted that a known approach stores all of the key recovery data at the primary site, and merely sends the encrypted session key and the key recovery data to the secondary site for verification and decryption. By storing an MSK at the secondary site in an embodiment of the present invention, a number of difficulties concerning password maintenance and certificate expiration can be obviated.

More particularly, a key escrow requester (e.g., registration authority-RA) can be authenticated at block 100 based on an administrator certificate. Block 104 provides for verifying that the authenticated key escrow requester is associated with a key escrow privilege. In this regard, many secondary sites that issue digital certificates can maintain a set of privileges for administrators such as the ability to change system configuration, the ability to approve/reject certificates and the ability to change privileges. By adding key recovery as a privilege, the secondary site can incorporate the key escrow and recovery process into a preexisting authentication scheme. Block 102 provides for receiving the MSK from the authenticated key escrow requester over a secure escrow connection, such as a secure sockets layer (SSL) connection.

Key recovery can be implemented by authenticating a key recovery requester at block 206 based on an administrator certificate. Processing block 108 provides for determining whether the authenticated key recovery requester is associated with a key recovery privilege. If the key recovery privilege is verified, then the MSK is retrieved from a memory located at the secondary site and is sent to the authenticated key recovery requester at block 110 over a secure recovery connection. Block 110 may also provide for recording the sending in an audit trail for future reference.

Figure 10:
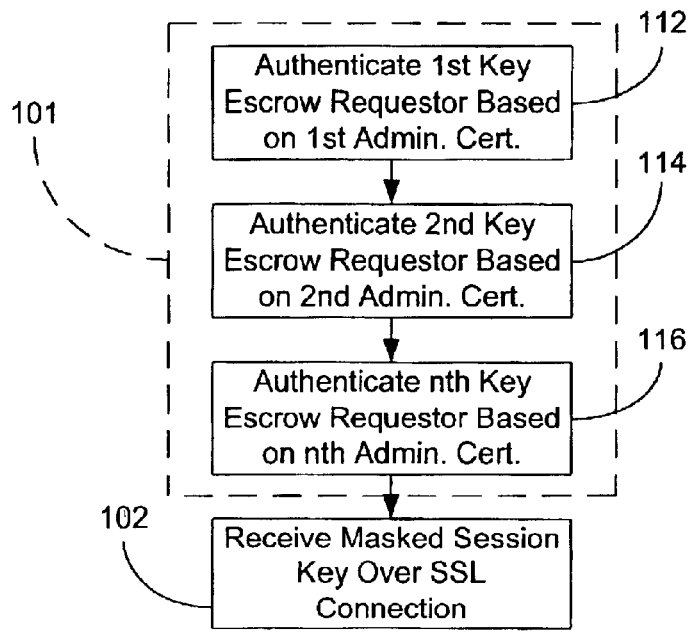
FIG. 10 is a flowchart of an example of a process of authenticating a key escrow requester in accordance with one embodiment of the invention.
Figure 11:
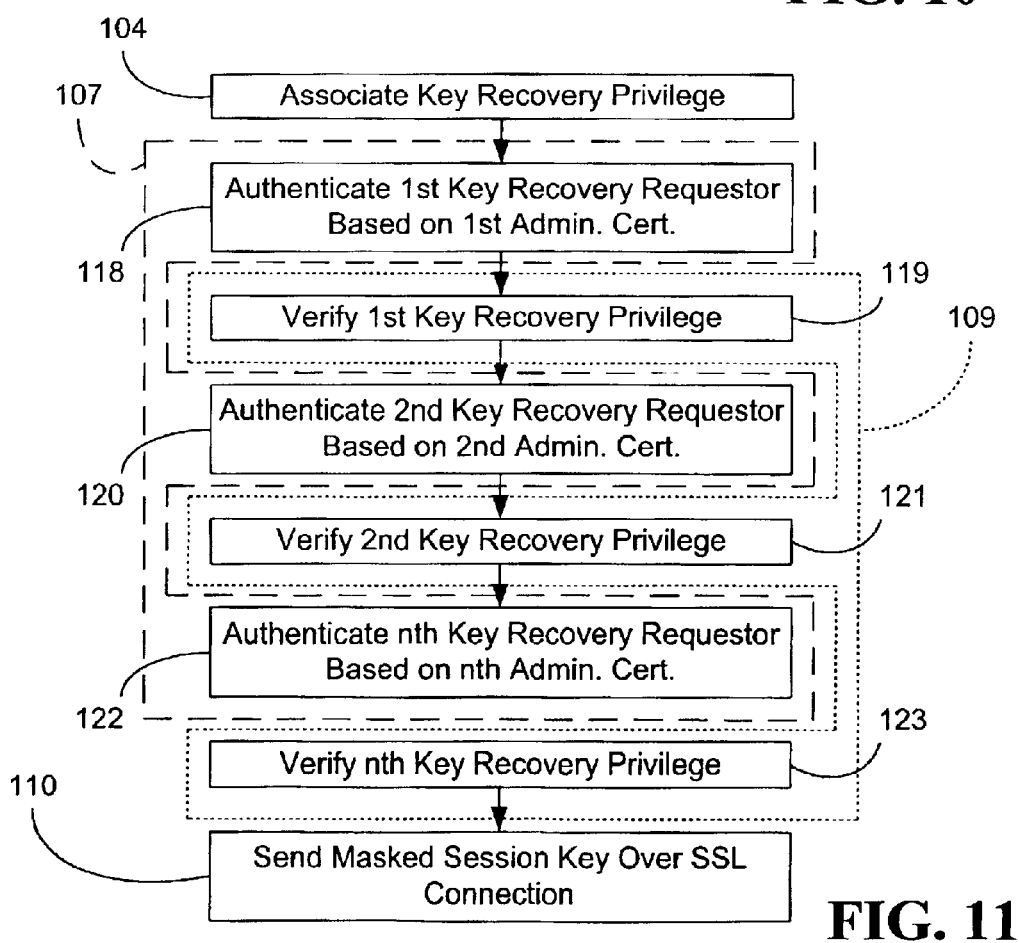
FIG. 11 is a flowchart of an example of a process of authenticating a key recovery requestor in accordance with one embodiment of the invention.
Figure 13:
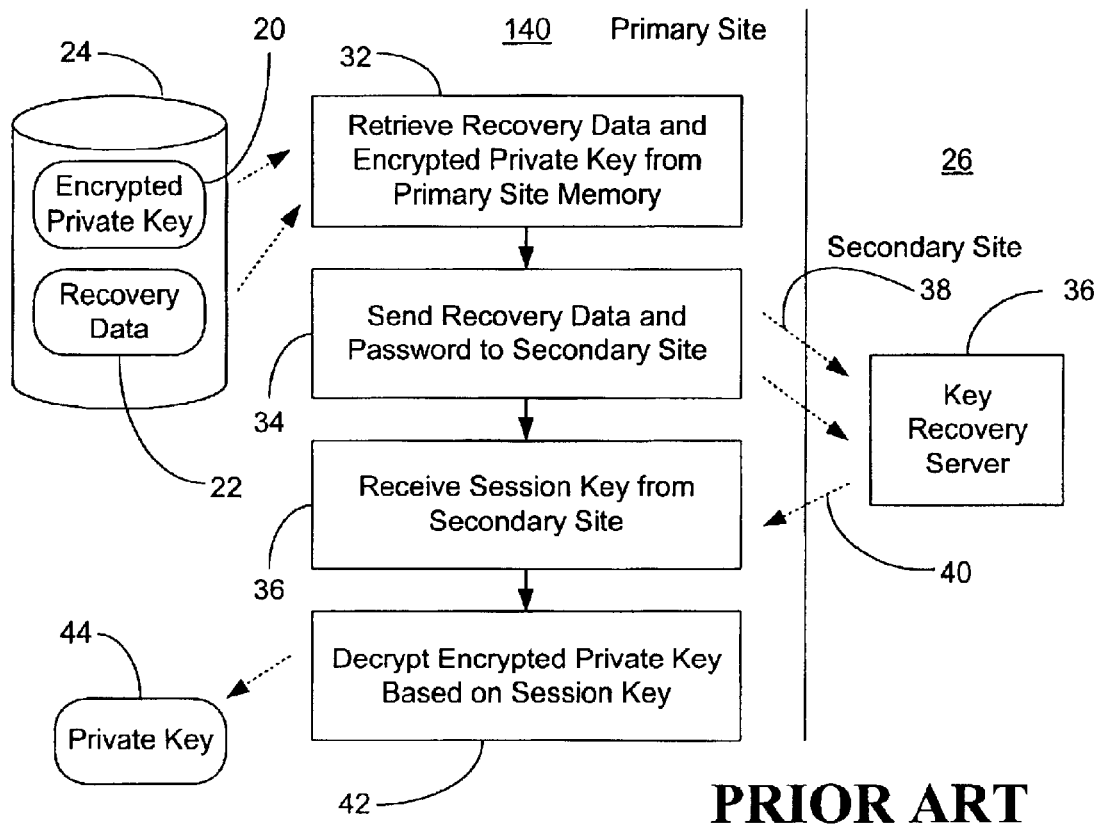
Figure 14:
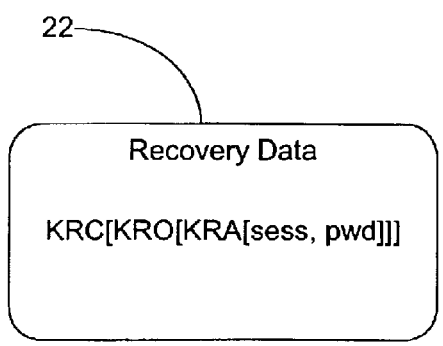

Turning now to FIG. 10, one approach to authenticating a key escrow requester is shown in greater detail at block 101. Specifically, added security can be achieved by requiring multiple administrators to authenticate themselves to the secondary site before key escrow will be permitted. Thus, block 112 provides for authenticating a first key escrow requester based on a first administrator certificate, block 114 provides for authenticating a second key escrow requester based on a second administrator certificate, and so on to the nth key escrow requester at block 116. Similarly, FIG. 11 shows one approach to authenticating a key recovery requester at block 107 and verifying key recovery privileges at block 109. A first key recovery requester is authenticated at block 118 and it is verified that the first key recovery requester is associated with a key recovery privilege at block 119. Block 120 provides for authentication of a second key recovery requestor and block 121 provides for verification that the second key recovery requester is associated with a key recovery privilege. The process continues on to the nth key recovery requestor at blocks 122 and 123.

The above-described embodiments can be more secure and easier to maintain than known key recovery systems. Instead of having to remember which passwords are needed to recover each escrowed key, primary sites can simply use their existing on-site administrator certificate(s) to authenticate themselves to the control center. In so doing, they can prove that they are authorized to perform key recovery. It is important to note that private keys are still escrowed at the primary site and are advantageously never revealed to the secondary site. In addition, the split nature of key recovery is preserved in that some information from the primary site and some information from the secondary site must be combined to recover a key. If an intruder steals the primary database, it can be computationally infeasible to recover any key. If they could somehow recover one key, that information would not provide any help in recovering another.

An embodiment of the present invention can be illustrated as follows. A first site is a client computer that has a first key which may be a 128 bit symmetric key. Other key sizes are also possible. The symmetric key is used to encrypt valuable and sensitive data stored on the client's hard drive. If the key is lost or destroyed, it would be difficult or impossible to recover the data from the hard drive. The client encrypts the first key with a 128 bit second key using the DES algorithm known in the art to obtain an encrypted first key. The client generates a random number, which is sometimes called a nonce. The nonce functions as a mask and is a piece of information that, for security purposes, is generally used only once. The client performs an XOR operation on the second key and the nonce to obtain a masked second key. The client then stores the nonce and the encrypted first key, and destroys the second key, e.g., by completely and permanently deleting it from memory. The client sends the masked second key to a second site, which is a trusted key recovery server. The client can command the second site to implement client-specified requirements for authenticating any entity that requests a copy of the masked second key from the second site, and/or to ensure that certain client-specified conditions are met before the second site sends a copy of the masked second key to a requester. For example, the client can demand that the second site send a copy of the masked second key to a requester only if the identity of the requester is verified using a digital certificate signed by a trusted third party, and if the request is received no later than 120 days after the masked second key was received by the second site, and if the requester is a member of the information technology staff of the client's company, or the client itself.

Eighty days later, the first key is accidentally deleted at the client, and the client cannot access the encrypted data stored on the hard drive. The client sends a request to the second site for the masked second key, along with the client's digital certificate, which has been issued by a trusted third party. The second site verifies the certificate, checks to make sure that the request is received within the 120-day limit, and verifies that the requester is the client itself. The second site sends the masked second key to the client. The client performs an XOR operation with the masked second key and the nonce to obtain the second key, which it uses to decrypt the encrypted first key. The client thus recovers the lost first key.

The present invention can include various other embodiments that will be appreciated by those skilled in the art, and is not limited to the particular illustrations given above. A key is made recoverable by encrypting it using a secret, and transforming that secret into two pieces (a first and second piece) of data such that both are required to recover the secret. The secret itself is deleted. Each of the two pieces of data are stored in different locations, and certain requirements have to be met to reunite them. When they are reunited, the secret is recovered, and is used to decrypt the encrypted key. In this way, the original key is recovered.

Those skilled in the art can now appreciate from the foregoing description that the broad techniques of the embodiments of the present invention can be implemented in a variety of forms. Therefore, while the embodiments have been described in connection with particular examples thereof, the true scope of the embodiments of the invention should not be so limited since other modifications will become apparent to the skilled practitioner upon a study of the drawings, specification, and following claims.

What is claimed is:

1. A method for escrowing a private key in a public key infrastructure, comprising:
   creating a key pair including a private key and a public key;
   creating a session key;
   encrypting the private key using the session key;
   creating a session key mask;
   storing the encrypted private key and the session key mask;
   creating a masked session key by exclusive-ORing the session key and the session key mask;
   deleting the session key; and
   sending the masked session key and a digital certificate to a secondary site.

2. The method of claim 1, further comprising:
   sending a key recovery request, including the digital certificate, to the secondary site;
   receiving the masked session key from the secondary site;
   recreating the session key by exclusive-ORing the masked session key and the session key mask; and
   recovering the private key by decrypting the encrypted private key using the recreated session key.

3. The method of claim 1, wherein the session key is a symmetric key.

4. The method of claim 1, wherein said creating the session key includes using a triple-data encryption standard and an initialization vector.

5. The method of claim 1, wherein the session mask is a random string having a bit-length equal to the session key.

6. The method of claim 1, wherein the session mask is a pseudo-random string having a bit-length equal to the session key.

7. The method of claim 2, wherein the key recovery request includes a plurality of digital certificates.

8. The method of claim 2, further comprising:
   combining the decrypted private key with a corresponding key pair certificate.

9. The method of claim 2, further comprising:
   creating an audit trail at the secondary site associated with the key recovery request.

10. A computer readable medium including instructions adapted to be executed by a processor to perform a method for escrowing a private key in a public key infrastructure, the method comprising:
    creating a key pair including a private key and a public key;
    creating a session key;
    encrypting the private key using the session key;
    creating a session key mask;
    storing the encrypted private key and the session key mask;
    creating a masked session key by exclusive-ORing the session key and the session key mask;
    deleting the session key; and
    sending the masked session key and a digital certificate to a secondary site.

11. The computer readable medium of claim 10, wherein the method further comprises:
    sending a key recovery request, including the digital certificate, to the secondary site;
    receiving the masked session key from the secondary site;
    recreating the session key by exclusive-ORing the masked session key and the session key mask; and
    recovering the private key by decrypting the encrypted private key using the recreated session key.

12. The computer readable medium of claim 10, wherein the session key is a symmetric key.

13. The computer readable medium of claim 10, wherein said creating the session key includes using a triple-data encryption standard and an initialization vector.

14. The computer readable medium of claim 10, wherein the session mask is a random string having a bit-length equal to the session key.

15. The computer readable medium of claim 10, wherein the session mask is a pseudo-random string having a bit-length equal to the session key.

16. The computer readable medium of claim 11, wherein the key recovery request includes a plurality of digital certificates.

17. The computer readable medium of claim 11, wherein the method further comprises:
    combining the decrypted private key with a corresponding key pair certificate.

18. The computer readable medium of claim 11, wherein the method further comprises:
    creating an audit trail at the secondary site associated with the key recovery request.

19. A system for escrowing a private key in a public key infrastructure, comprising:
    a secondary site, coupled to the network, including a secondary database and a control center; and
    a primary site, coupled to a network, including a primary database and a key management server, adapted to:
    create a key pair including a private key and a public key,
    create a session key,
    encrypt the private key using the session key,
    create a session key mask, store the encrypted private key and the session key mask in the primary database, create a masked session key by exclusive-ORing the session key and the session key mask, delete the session key, and send the masked session key and a digital certificate to the secondary site for storage within the secondary database.

20. The system of claim 19, wherein the primary site is further adapted to:

send a key recovery request, including the digital certificate, to the secondary site;

receive the masked session key from the secondary site;

recreate the session key by exclusive-ORing the masked session key and the session key mask; and recover the private key by decrypting the encrypted private key using the recreated session key.

21. The system of claim 19, wherein the session key is a symmetric key.

22. The system of claim 19, wherein said creating the session key includes using a triple-data encryption standard and an initialization vector.

23. The system of claim 19, wherein the session mask is a random string having a bit-length equal to the session key.

24. The system of claim 19, wherein the session mask is a pseudo-random string having a bit-length equal to the session key.

25. The system of claim 20, wherein the key recovery request includes a plurality of digital certificates.

26. The system of claim 20, wherein the primary site is further adapted to:

combine the decrypted private key with a corresponding key pair certificate.

* * * * *